United States Patent
Garrido-Lopez et al.

(10) Patent No.: US 10,424,210 B2
(45) Date of Patent: Sep. 24, 2019

(54) METHOD AND ELECTRONIC DEVICE FOR PROVIDING AN OPTIMAL QUANTITY OF AIRCRAFT FUEL

(71) Applicant: The Boeing Company, Chicago, IL (US)

(72) Inventors: David Garrido-Lopez, Tres Cantos (ES); Maxim Constantijn Vos, Madrid (ES); Johan De Prins, Molenstede (BE); Anne Jacqueline Gertruda Theodora Scholtes, Delft (NL)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/915,132

(22) Filed: Mar. 8, 2018

(65) Prior Publication Data
US 2018/0261105 A1    Sep. 13, 2018

(30) Foreign Application Priority Data

Mar. 9, 2017  (EP) ..................................... 17382119

(51) Int. Cl.
*G08G 5/00* (2006.01)
*G06Q 10/04* (2012.01)
(Continued)

(52) U.S. Cl.
CPC ......... *G08G 5/0039* (2013.01); *G06Q 10/047* (2013.01); *G07C 5/085* (2013.01);
(Continued)

(58) Field of Classification Search
None
See application file for complete search history.

(56) References Cited

U.S. PATENT DOCUMENTS

| | | | |
|---|---|---|---|
| 5,606,505 A * | 2/1997 | Smith | G05D 1/0005 701/15 |
| 2007/0032941 A1 * | 2/2007 | Allen | G01C 23/005 701/123 |

(Continued)

OTHER PUBLICATIONS

Kundu et al., "Theory and Practice of Aircraft Performance", 2016, John Wiley & Sons, p. 574-577 (Year: 2016).*

(Continued)

*Primary Examiner* — Tamara L Weber
(74) *Attorney, Agent, or Firm* — Coats & Bennett, PLLC (57) ABSTRACT

A method and electronic device for providing an optimal quantity of aircraft fuel. The method comprises collecting recorded flight data from past flights of an aircraft; determining aircraft specific performance correction parameters per flight phase, using the recorded flight data; collecting a flight plan of the aircraft; determining the total fuel required for the given flight plan, using the aircraft specific performance correction parameters; determining a single synthetic drag factor ($\epsilon_{D_{FMS}}$) and a single synthetic fuel factor ($\epsilon_{FF_{FMS}}$) that, when used by the aircraft FMS, yield the said total fuel required for the given flight plan; receiving an estimated total fuel required determined by the aircraft FMS based on the flight plan, the single synthetic drag factor ($\epsilon_{D_{FMS}}$) and the single synthetic fuel factor ($\epsilon_{FF_{FMS}}$). The method allows reducing the fuel weight and total flight cost, and is particularly advantageous for FMS which only admit one single drag factor and one single fuel factor.

18 Claims, 8 Drawing Sheets

(51) Int. Cl.
G07C 5/08 (2006.01)
G07C 5/12 (2006.01)

(52) U.S. Cl.
CPC ............ *G07C 5/12* (2013.01); *G08G 5/0034* (2013.01); *G08G 5/0091* (2013.01)

(56) References Cited

U.S. PATENT DOCUMENTS

| | | | |
|---|---|---|---|
| 2013/0046422 A1* | 2/2013 | Cabos | G08G 5/0034 |
| | | | 701/3 |
| 2013/0075532 A1 | 3/2013 | Fuscone et al. | |
| 2013/0325219 A1* | 12/2013 | Pitard | G07C 5/0825 |
| | | | 701/14 |
| 2014/0277853 A1* | 9/2014 | Castillo-Effen | G08G 5/0095 |
| | | | 701/3 |
| 2015/0279218 A1 | 10/2015 | Irrgang et al. | |
| 2018/0003506 A1* | 1/2018 | Ghaemi | G06F 7/64 |

OTHER PUBLICATIONS

Cahill et al., "Understanding and Improving Flight Crew Performance of the Preflight, Flight Planning, and Briefing Task", 2013, The International Journal of Aviation Psychology, 23(1), p. 34-37 (Year: 2013).*
Moir et al., "Civil Avionics Systems", 2013, John Wiley & Sons, p. 413-427 (Year: 2013).*
Anderson et al., "Cruise Performance Monitoring", 2006, boeing.com/commercial/aeromagazine, p. 5-11 (Year: 2006).*
Liden, S, Ed., IEEE, "The Evolution of Flight Management Systems," Digital Avionics Systems Conference, Phoenix, AZ, Oct. 30, 1994, pp. 157-194.

* cited by examiner

|  | length of cruise segment [NM] | |
| --- | --- | --- |
|  | 546 NM | 250 NM |
| weight of climb term in equation [9] | 19% | 31% |
| weight of cruise term in equation [9] | 73% | 55% |
| weight of descent term in equation [9] | 8% | 14% |

Fig. 5

|  | fuel estimate in flight plan [lbs] | fuel factor [%] |
| --- | --- | --- |
| climb | 4,160 | 1.8 |
| cruise | 6,400 | 3.7 |
| descent | 960 | 2.8 |
| total | 11,520 | $\epsilon_{FF_{FMS}} = 2.9$ |

METHOD AND ELECTRONIC DEVICE FOR PROVIDING AN OPTIMAL QUANTITY OF AIRCRAFT FUEL

CROSS-REFERENCE TO RELATED APPLICATION

This application claims the benefit of European Application No. 17382119.0, filed on Mar. 9, 2017, the disclosure of which is incorporated herein by reference in its entirety.

FIELD

The present disclosure is comprised in the field of avionics, and relates to methods and systems for improving aircraft performance. More particularly, the disclosure is aimed to estimate more accurate fuel consumption for a determined flight plan and reduce the quantity of fuel loaded onto an aircraft prior to execution of the given flight plan.

BACKGROUND

Fuel estimation is typically used to identify fuel requirements for a given flight plan. The fuel estimates can then be used to determine how much fuel to load for a particular flight. Therefore, the accuracy of the fuel estimate can be important to flight planning. If the estimate under calculates the amount of fuel that may be needed, then sufficient fuel may not be loaded for the flight. Alternatively, if the estimate over calculates the amount of fuel needed, then more fuel than needed may be loaded which then may add unnecessary weight to a flight and negatively impact its performance. In addition, many times pilots may add more fuel than estimated by current systems to account for known inaccuracies and to minimize risks of fuel shortages.

For example, airlines use flight planning tools to create flight plans for their flights. These flight planning tools use the drag and fuel factors calculated by Aircraft Performance Monitoring (APM) tools as input. Existing APM tools calculate drag and fuel factors of a particular aircraft tail and engines using recorded flight data of previous flights. These drag and fuel factors can be calculated per flight phase: climb, cruise and descent.

The drag factor $\epsilon_D$ and fuel factor $\epsilon_{FF}$ are two input parameters of a Flight Management System (FMS) prior to departure, aimed to correct the aircraft performance model and reflects the correct fuel consumption of the particular aircraft tail and engines. As the aircraft and engines age, the drag and fuel flow increase, while engine maintenance decreases the fuel consumption. The drag factor and fuel factor are also known as the Flight Management Computer (FMC) performance factors or flight planning factors.

However, in many cases the FMS can only take one drag factor and one single fuel factor as input. In current practice, aircraft FMS typically estimate fuel requirements for a given flight plan using only two static, pre-defined factors (drag factor and fuel factor) for one flight phase (cruise). These single drag and fuel factors are applied to the aircraft performance model in all flight phases of the flight plan (climb, cruise and descent). Typically, the drag and fuel factors calculated from the historical cruise segments (not climb or descent segments) are used by the FMS. This leads to differences in the trip fuel estimate between the FMS and the flight plan in the climb and descent phases.

When the flight plan is input to the FMS prior to the flight, the FMS calculates the estimated fuel on board at destination so that pilots know whether there will be enough fuel to safely reach the destination or not. The fuel estimated by the FMS normally differs from the fuel computed by the flight planning tool, as the FMS uses only two static factors (the drag and fuel factor corresponding to the cruise phase) whereas the flight planning tool uses six factors (a drag and fuel factor per climb, cruise and descent flight phase). Due to this discrepancy between the trip fuel estimates of the FMS and the flight plan, pilots may request more fuel to be loaded onboard since they trust the calculation performed by the certified FMS.

While cruise is of longest duration and burns the greatest quantity of fuel, pilots may load additional fuel to address known and perceived risks that additional fuel may be required. For example, pilots may load additional fuel to cover the fuel required during climb and descent. Pilots may load additional fuel on older aircraft and specifically older aircraft that they are familiar with that typically burn more fuel than estimated by the FMS because of degrading airframe drag and engine efficiency. They also may load more fuel based upon weather forecasts, and air space congestion. While loading additional fuel reduces the risk that an aircraft may need to be redirected because of low fuel, loading additional fuel increases the aircraft weight, total fuel burned, and total flight cost.

Document US 2015/279218-A1 discloses a method for providing for providing accurate fuel load calculations considering the actual flight plan and aircraft wear.

The proposed method removes the discrepancy between the trip fuel estimate of the FMS and the fuel computed by the flight planning tool, allowing to obtain from the certified FMS an accurate fuel estimate and load an optimal quantity of fuel on an aircraft that minimizes aircraft weight and burn consumption for a specific flight plan, taking into consideration the flight plan, the aircraft specific performance factors and, optionally, the weather forecast for the flight plan.

SUMMARY

The present disclosure refers to a method and electronic device for providing and loading an optimal quantity of aircraft fuel. The method determines improved performance factors for Flight Management System (FMS) tailored to a particular flight plan. The method improves trip fuel estimates computed by a FMS by enhancing the determination of a single FMS drag factor and a single FMS fuel factor. The method takes into account the differences in performance computed from recorded flight data during climb, cruise, and descent of the particular aircraft, rather than only considering the cruise phase. The method combines these performance differences with the flight plan of the upcoming trip, and obtains a single drag factor and a single fuel factor to be used by the FMS before departure to load an optimal amount of fuel onto the aircraft for the given flight plan.

Current APM tools can calculate drag and fuel factors per flight phase and flight planning tools can use all these drag and fuel factors. However, no method exists to calculate a single drag factor and a single fuel factor that, when used by the FMS, result in no discrepancies in trip fuel estimate with the flight plan. This method is especially advantageous to FMS which only admit one single drag factor and one single fuel factor. The present method does not compute a weighted average of the drag factor and fuel factor based on the fuel weights per flight phase, since it would not lead to zero discrepancy in trip fuel estimate. Additionally, the value of the drag factor influences the value of the fuel factor, so weighing the drag factor requires new fuel factors per flight phase.

The FMS of some aircraft are prepared to use drag and fuel factors per flight phase. However, other aircraft are equipped with an FMS which can deal only with a single drag factor and a single fuel factor. Updating the latter FMS to allow dealing with drag and fuel factors per flight phase requires a major change to the FMS functionality, new certification and is therefore very costly. By using the present method, changes to existing FMS functionality are not required (it would be prohibitively costly to develop, certify, and deploy a new FMS for existing aircraft that uses these six aircraft-specific factors to determine fuel requirements for a given flight plan).

The method for providing an optimal quantity of aircraft fuel comprises collecting recorded flight data from past flights of an aircraft; determining aircraft specific performance correction parameters comprising drag and fuel factors for each of the climb, cruise, and descent flight phases, using the recorded flight data; collecting a flight plan of the aircraft; determining the total fuel required for the given flight plan, using the aircraft specific performance correction parameters; and determining a single synthetic drag factor and a single synthetic fuel factor that, when used by the aircraft FMS, yield the said total fuel required for the given flight plan.

The method also comprises communicating (for instance, wirelessly) the given flight plan, the single synthetic drag factor and the single synthetic fuel factor to the aircraft FMS; receiving an estimated total fuel required determined by the aircraft FMS using the given flight plan, the single synthetic drag factor and the single synthetic fuel factor; and request loading of an amount of fuel onto the aircraft based on the estimated total fuel required (122) for the given flight plan (108) (e.g. such that the total fuel load is substantially equal to the said estimated total fuel required for the given flight plan). The step of determining the total fuel required for the given flight plan is performed using a flight planning tool, whereas the step of determining aircraft specific performance correction parameters for each flight phase is performed using an Aircraft Performance Monitoring tool.

According to an embodiment, the step of determining a single synthetic drag factor and a single synthetic fuel factor comprises the following steps: determining a single synthetic drag factor using the flight plan and the aircraft specific drag factors per flight phase; calculating updated fuel factors for climb, cruise, and descent flight phases using the calculated synthetic drag factor; and determining a single synthetic fuel factor using the updated fuel factors.

The single synthetic drag factor may be determined taking the condition that the estimated total fuel required for the given flight plan using the single synthetic drag factor is substantially the same as the total fuel required when using the aircraft specific drag factors per flight phase.

The updated fuel factors may be calculated by deriving thrust levels from each flight condition using the synthetic drag factor; from each of the derived thrust levels, calculating an expected fuel flow; calculating the fuel flow deviations using the expected fuel flows; and calculating the updated fuel factors using the fuel flow deviations.

The single synthetic fuel factor may be determined taking the condition that the estimated total fuel required for the given flight plan using the single synthetic fuel factor is substantially the same as the total fuel required when using updated fuel factors per flight phase.

The method may further comprise collecting additional data including factors that affect the total fuel required, wherein said additional data is used to determine the total fuel required. The additional data may comprise, for instance, weather conditions or air space delays for the given flight plan.

A further aspect of the present disclosure includes an electronic device for providing an optimal quantity of aircraft fuel. The electronic device comprises an electronic device with a processing unit configured to collect recorded flight data from past flights of an aircraft; determine aircraft specific performance correction parameters comprising drag and fuel factors for each of the climb, cruise, and descent flight phases, using the recorded flight data; collect a flight plan of the aircraft; determine the total fuel required for the given flight plan, using the aircraft specific performance correction parameters; and determine a single synthetic drag factor and a single synthetic fuel factor that, when used by the aircraft FMS, yield the said total fuel required for the given flight plan. In an embodiment, the electronic device comprises a wireless communication module configured to wirelessly communicate the single synthetic drag factor and the single synthetic fuel factor to the aircraft FMS. The electronic device may be further configured to receive (e.g. wirelessly) an estimated total fuel required determined by the aircraft FMS using the given flight plan and the synthetic factors.

A yet further aspect of the present disclosure refers to a computer program product for providing an optimal quantity of aircraft fuel, comprising computer code instructions that, when executed by a processor, causes the processor to collect recorded flight data from past flights of an aircraft; determine aircraft specific performance correction parameters per flight phase, using the recorded flight data; collect a flight plan of the aircraft; determine the total fuel required for the given flight plan, using the aircraft specific performance correction parameters; and determine a single synthetic drag factor and a single synthetic fuel factor that, when used by the aircraft FMS, yield the said total fuel required for the given flight plan.

In the present method a single drag factor $\epsilon_{D_{FMS}}$ and a single fuel factor $\epsilon_{FF_{FMS}}$ (hereinafter referred to as combined factors or synthetic factors) are calculated, based on the drag and fuel factors per flight phase calculated from recorded flight data of previous flights and the flight plan of the upcoming flight. The invention therefore improves FMS estimates while not requiring any change to the existing FMS functionality.

In other embodiments, weather, air space delays, and other factors can be used when determining the total fuel required and the synthetic drag and fuel factors.

The present method allows to identify the performance corrections per flight phase, improving the calculation of drag and fuel factors and updating these factors more frequently. With the present method the aircraft performance factors (synthetic factors) can in fact be computed and applied prior to each flight, since it takes into consideration the specific flight plan (distance, waypoints, altitude, airspeeds, weights, etc.), latest aircraft specific performance correction parameters and additional factors, such as current weather conditions or air space congestion.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

A series of drawings which aid in better understanding the invention and which are expressly related with an embodiment of said invention, presented as a non-limiting example thereof, are very briefly described below.

DETAILED DESCRIPTION

Figure 1:
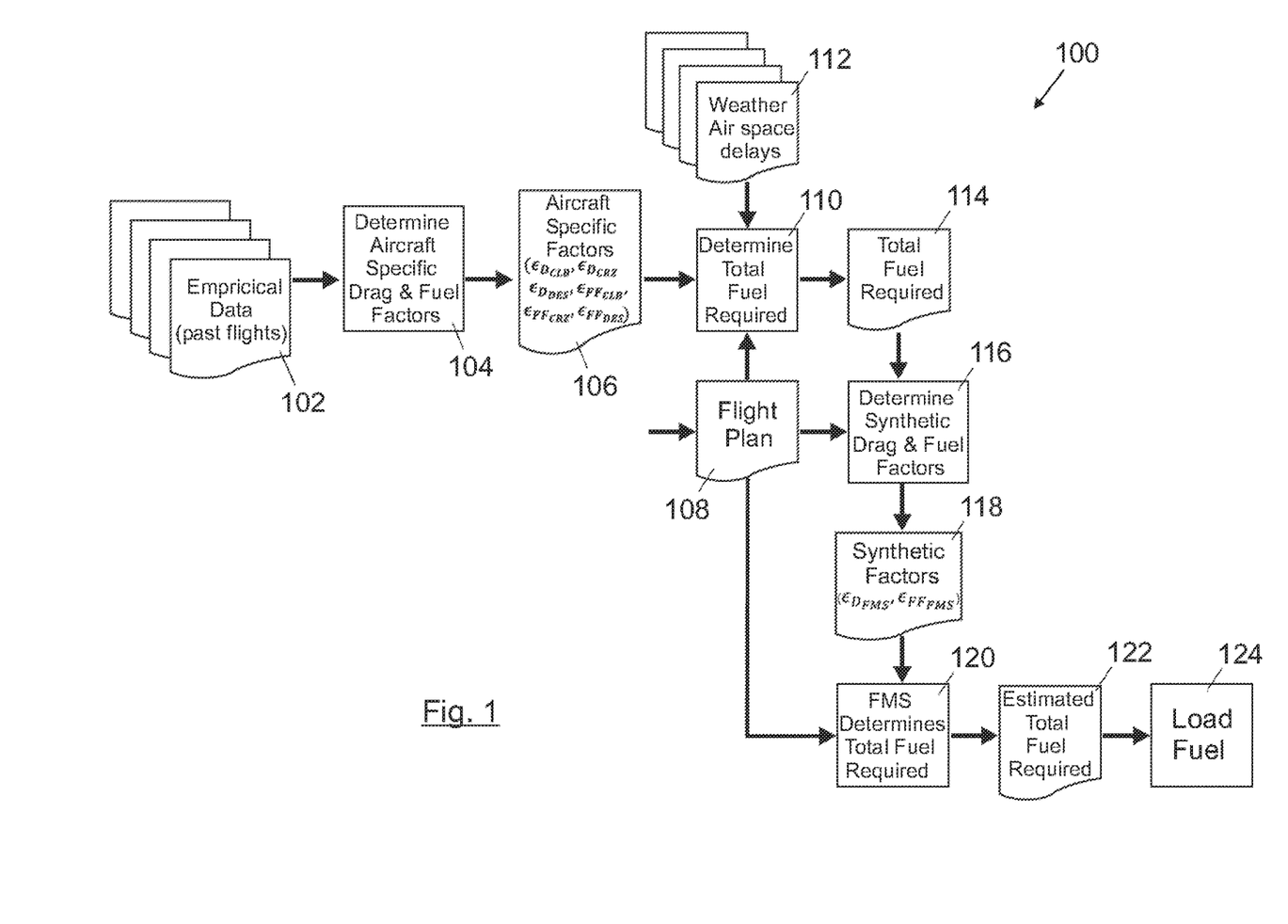
FIG. 1 represents a flow diagram of the method for loading an optimal quantity of aircraft fuel, according to the present disclosure.

The present disclosure refers to a method and electronic device for providing and loading an optimal quantity of aircraft fuel. FIG. 1 represents an exemplary flow diagram of the method 100. Empirical flight data 102 recorded from past flights of an aircraft is collected to determine 104 aircraft specific performance correction parameters per flight phase (normally, for each of the climb, cruise, and descent flight phases). In the embodiment of FIG. 1, the aircraft specific performance correction parameters 106 comprise drag and fuel factors ($\epsilon_{D_{CLB}}$, $\epsilon_{D_{CRZ}}$, $\epsilon_{FF_{CLB}}$, $\epsilon_{FF_{CRZ}}$, $\epsilon_{FF_{DES}}$) for each of the climb, cruise, and descent flight phases. The aircraft specific performance correction parameters 106 may be calculated, for instance, by an Aircraft Performance Monitoring (APM) tool.

In step 110, the total fuel required 114 for a given flight plan 108 is determined (for instance, by a flight planning tool), using the aircraft specific performance correction parameters 106. Optionally, additional data 112 including variables or factors that affect the total fuel required, such as weather conditions (e.g. current or predicted weather) or air space delays for the given flight plan 108, is collected and used to determine the total fuel required 114.

In step 116, synthetic factors 118 are determined. The synthetic factors 118 comprise a single synthetic drag factor ($\epsilon_{D_{FMS}}$) and a single synthetic fuel factor ($\epsilon_{FF_{FMS}}$). These synthetic factors 118 ($\epsilon_{D_{FMS}}$, $\epsilon_{FF_{FMS}}$) are computed with the condition that, when used by the aircraft FMS, yield the said total fuel required 114 for the given flight plan 108. The given flight plan 108, the single synthetic drag factor ($\epsilon_{D_{FMS}}$) and the single synthetic fuel factor ($\epsilon_{FF_{FMS}}$) are communicated to the aircraft FMS (for instance, wirelessly or by manual input). With the given flight plan 108 and the synthetic drag and fuel factors 118, the aircraft FMS determines 120 an estimated total fuel required 122. The method comprises receiving the estimated total fuel required 122 and request loading of an amount of fuel onto the aircraft based on the estimated total fuel required 122 for the given flight plan 108. Finally, an amount of fuel is loaded 124 onto the aircraft such that the total fuel load is the same as the estimated total fuel required 122 for the given flight plan 108.

Figure 2:
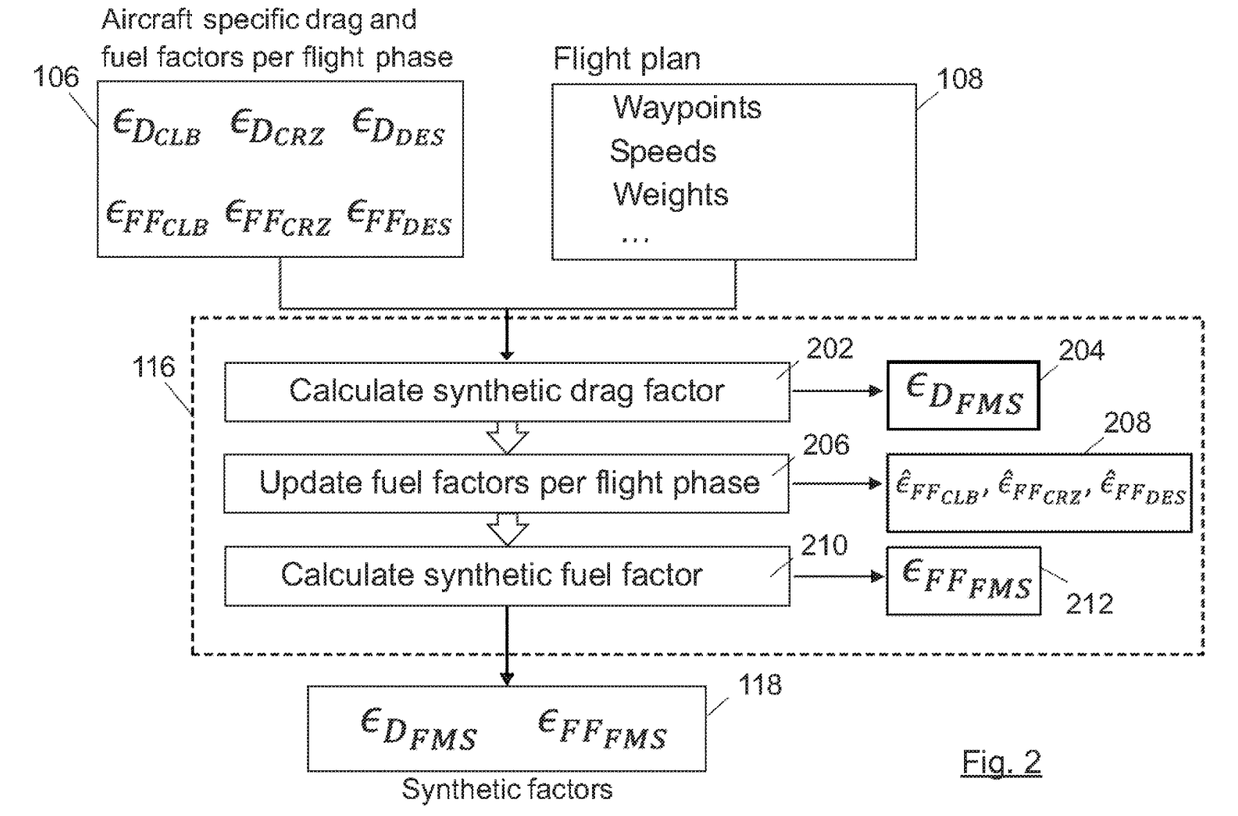
FIG. 2 depicts, according to an embodiment, the steps of a method to calculate synthetic drag and fuel factors.

FIG. 2 depicts an exemplary embodiment of the step of determining 116 synthetic drag and fuel factors. First, a single synthetic drag factor 204 ($\epsilon_{D_{FMS}}$) is calculated 202 based on the flight plan 108 (including waypoints, airspeeds, etc.) and the aircraft specific drag and fuel factors 106 per flight phase. The synthetic drag factor results from the following condition: the resulting fuel consumption predicted with the single synthetic drag factor equals the resulting fuel consumption predicted using the original drag factors different for each phase (see equation [9] below). In this calculation, the effect of fuel factors is neglected, and they are not used in the equations. This simplification is valid in order to ascertain the average effect of drag deviations.

Since the values of the drag factors influence the values of the fuel factors, in step 206 the fuel factors per flight phase 208 ($\hat{\epsilon}_{FF_{CLB}}$, $\hat{\epsilon}_{FF_{CRZ}}$, $\hat{\epsilon}_{FF_{DES}}$) are updated based on the synthetic drag factor 204 previously computed. Finally, a single synthetic fuel factor 212 ($\epsilon_{FF_{FMS}}$) is calculated 210.

Figure 3:
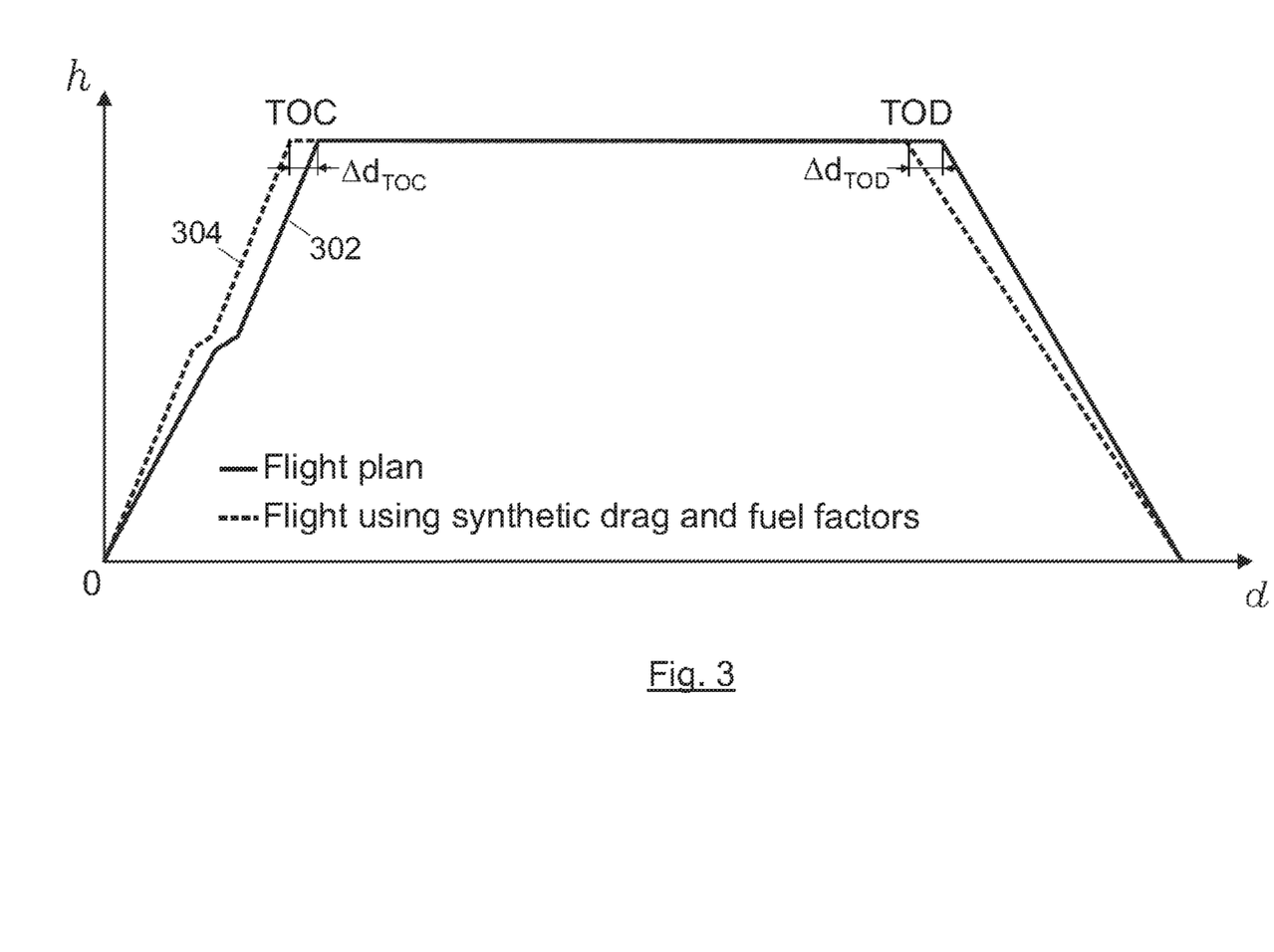
FIG. 3 illustrates an altitude profile of a flight plan obtained by a flight planning tool and an FMS flight plan using synthetic drag and fuel factors.
Figure 4:
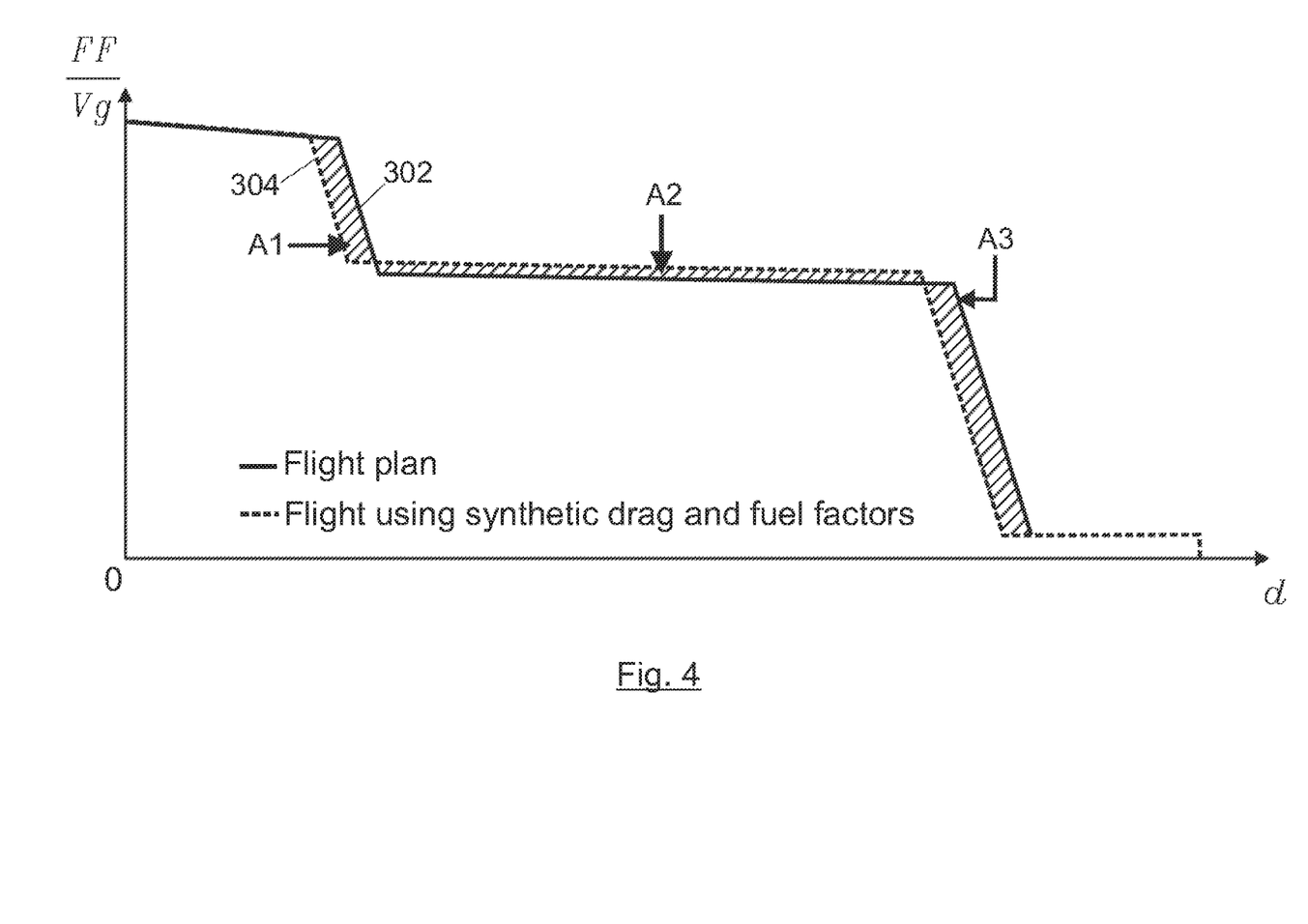
FIG. 4 illustrates the fuel flow over ground speed for a flight plan obtained by a flight planning tool and for a FMS flight plan using synthetic drag and fuel factors.

FIG. 3 shows two graphs of the altitude (h) profile of a certain flight over the distance (d) traveled. In particular, FIG. 3 depicts a flight plan 302 obtained by a flight planning tool, based on drag and fuel factors ($\epsilon_{D_{CLB}}$, $\epsilon_{D_{CRZ}}$, $\epsilon_{FF_{CLB}}$, $\epsilon_{FF_{CRZ}}$, $\epsilon_{FF_{DES}}$) per flight phase, and the equivalent flight plan 304 as calculated by the FMS using the synthetic drag and fuel factors ($\epsilon_{D_{FMS}}$, $\epsilon_{FF_{DMS}}$). FIG. 4 schematically shows the fuel flow over ground speed $$\left(\frac{FF}{V_g}\right)$$

for both flight plans (302, 304) of FIG. 3. By calculating and using the synthetic drag and fuel factors 118, discrepancy in trip fuel estimate between the FMS and the flight planning tool is removed. The errors in fuel prediction in climb and descent phases are absorbed in the cruise phase, as FIG. 4 shows schematically. By applying the present method, the predicted trip fuel obtained by the FMS coincides with that of the flight planning tool without changing the existing FMS functionality.

As depicted in step 202 of FIG. 2, a single synthetic drag factor 204 ($\epsilon_{D_{FMS}}$) is calculated. The calculation of the synthetic drag factor 204 is hereinafter described, according to an embodiment:

1. Climb: During climb the engines are providing maximum take-off thrust, not influenced by the aircraft specific drag and fuel factors. The speed is controlled by the elevators. Therefore, the difference between the climb drag factor ($\epsilon_{D_{CLB}}$) and synthetic drag factor ($\epsilon_{D_{FMS}}$) results in a difference in distance ($\Delta d_{TOC}$) to top of climb (TOC), as shown in the example of FIG. 3. FIG. 4 schematically depicts the fuel flow over ground speed of the same flight and the filled area A1 represents the difference in fuel consumption in climb between the flight plan 302 using the climb drag factor and the flight plan 304 using the synthetic drag factor. The equation of motion in the direction of flight in climb is:

$$m\frac{dV}{dt} = T - D - W\sin\gamma$$

where m is the aircraft mass in kilograms, V the true airspeed in meters per second, t the time in seconds, T the thrust in Newton, D the drag in Newton, W the weight in Newton and γ the flight path angle in radians. For small flight path angle γ, sin γ≈γ. Assuming a constant flight path angle, and by subtracting the equation of motion for the climbs of both flight plans (302, 304):

$$\Delta \gamma = \gamma|_{\epsilon_{D_{FMS}}} - \gamma|_{\epsilon_{D_{CLB}}} = \frac{-\Delta D}{W} \quad [1]$$

The difference in drag ΔD of the two flight plans (302, 304) is caused by the corresponding drag factors:

$$\Delta D = (\epsilon_{D_{FMS}} - \epsilon_{D_{CLB}})D \quad [2]$$

Combining equation [1] and [2] results in:

$$\Delta \gamma = (\epsilon_{D_{CLB}} - \epsilon_{D_{FMS}})\frac{D}{W} = (\epsilon_{D_{CLB}} - \epsilon_{D_{FMS}})\overline{\left(\frac{C_D}{C_L}\right)}_{CLB} \quad [3]$$

where $C_D$ is the dimensionless drag coefficient, $C_L$ the dimensionless lift coefficient, $$\overline{\left(\frac{C_D}{C_L}\right)}_{CLB}$$

the average drag over lift (i.e. inverse of the aerodynamic efficiency) in climb.

The difference in distance ($\Delta d_{TOC}$) to top of climb (TOC), caused by the different drag factors, follows from simple trigonometry:

$$\Delta d_{TOC_{FP-FMS}} = \frac{d_{CLB}^2}{h_{TOC}}\Delta \gamma$$

where $d_{CLB}$ is the distance to top of climb of the flight plan in NM, $h_{TOC}$ the altitude of the top of climb in NM. The difference in fuel consumption in climb between using the climb drag factor ($\epsilon_{D_{CLB}}$) and the synthetic drag factor ($\epsilon_{D_{FMS}}$), filled area A1 in FIG. 4, is then given by:

$$\Delta W_{f_{CLB}} = \left(\frac{FF_{CLB} - FF_{CRZ}}{V_{g_{TOC}}}\right)\Delta d_{CLB_{FP-FMS}} = \quad [4]$$

$$\left(\frac{FF_{CLB} - FF_{CRZ}}{V_{g_{TOC}}}\right)\frac{d_{CLB}^2}{h_{TOC}}(\epsilon_{D_{CLB}} - \epsilon_{D_{FMS}})\overline{\left(\frac{C_D}{C_L}\right)}_{CLB}$$

where $\Delta W_{f_{CLB}}$ is the difference in fuel consumption in climb in pounds, $FF_{CLB}$ is the fuel flow in climb (with maximum take-off thrust) in pounds per hour and $FF_{CRZ}$ is the fuel flow in cruise just after the top of climb in pounds per hour.

2. Cruise: The difference in fuel consumption in cruise between the flight plan based on the cruise drag factor and synthetic drag factor, filled area A2 in FIG. 4, is given by:

$$\Delta W_{f_{CRZ}} = \int_{TOC}^{TOD}\frac{FF(\epsilon_{D_{CRZ}}) - FF(\epsilon_{D_{FMS}})}{V_g}dx \quad [5]$$

where $\Delta W_{f_{CRZ}}$ is the difference in fuel consumption in cruise in pounds, $FF(\epsilon_{D_{CRZ}})$ is the instantaneous fuel flow in pounds per hour at a certain thrust using the cruise drag factor ($\epsilon_{D_{CRZ}}$), $FF(\epsilon_{D_{FMS}})$ is the instantaneous fuel flow in pounds per hour at a certain thrust using the synthetic drag factor ($\epsilon_{D_{FMS}}$).

The instantaneous fuel flows can be expanded using a Taylor series:

$$FF(\epsilon) \equiv FF((1 + \epsilon)T) = FF(T) + \frac{\partial FF}{\partial T}T\epsilon + \dots \quad [6]$$

Combining equations [5] and [6] leads to the difference in fuel consumption in cruise $\Delta W_{f_{CRZ}}$, and by assuming the area can be approximated by averaging the values in the formula at the top of climb and top of descent, we obtain:

$$\Delta W_{f_{CRZ}} = \int_{TOC}^{TOD}\frac{\frac{\partial FF}{\partial T}(x)D}{V_g}(\epsilon_{D_{CRZ}} - \epsilon_{D_{FMS}})dx = \quad [7]$$

$$\frac{\left[\frac{\partial FF}{\partial T}\frac{D}{V_G}\right]_{TOC} + \left[\frac{\partial FF}{\partial T}\frac{D}{V_G}\right]_{TOD}}{2}(\epsilon_{D_{CRZ}} - \epsilon_{D_{FMS}})(d_{TOD} - d_{TOC})$$

where $$\frac{\partial FF}{\partial T}$$

is the derivative or the fuel flow to thrust and can be calculated using the aircraft performance model, D the drag in Newton, $d_{TOD}$ the distance to top of descent in NM, $d_{TOC}$ the distance to top of climb in NM.

3. Descent: The difference between the descent drag factor ($\epsilon_{D_{DES}}$) and synthetic drag factor ($\epsilon_{D_{FMS}}$) results in a difference in distance ($\Delta d_{TOD}$) to top of descent (TOD), depicted in the example of FIG. 4. The derivation of the difference in fuel consumption in descent between the flight plans (302, 304) based on the descent drag factor and synthetic drag factor, area A3 in FIG. 4, is similar to that of the difference in fuel consumption in climb. The result is given by:

$$\Delta W_{f_{DES}} = \left(\frac{FF_{CRZ} - FF_{DES}}{V_{g_{TOD}}}\right)\Delta d_{TOD_{FP-FMS}} = \quad [8]$$

$$\left(\frac{FF_{CRZ} - FF_{DES}}{V_{g_{TOD}}}\right)\frac{d_{DES}^2}{h_{TOD}}(\epsilon_{D_{DES}} - \epsilon_{D_{FMS}})\overline{\left(\frac{C_D}{C_L}\right)}_{DES}$$

where $\Delta W_{f_{DES}}$ is the difference in fuel consumption in descent in pounds, $FF_{CRZ}$ is the fuel flow in cruise just before the top of descent in pounds per hour, $FF_{DES}$ is the fuel flow in descent (idle thrust regime) in pounds per hour, $d_{DES}$ is the distance from top of descent to the destination runway in NM, $h_{TOD}$ the altitude of the top of descent in NM, $$\overline{\left(\frac{C_D}{C_L}\right)}_{DES}$$

the average drag over lift (i.e. inverse of the aerodynamic efficiency) in descent.

By applying the condition that the total fuel required for both flight plans (302, 304) are the same (i.e. the predicted trip fuel obtained by the FMS coincides with the trip fuel obtained by flight planning tool), filled areas A1, A2 and A3 must cancel, so that:

$$\Delta W_{f_{CLB}} + \Delta W_{f_{CRZ}} + \Delta W_{f_{DES}} = 0$$

The synthetic drag factor ($\epsilon_{D_{FMS}}$) can be calculated from this condition, using equations [4], [7] and [8]:

$$\left(\frac{FF_{CLB} - FF_{CRZ}}{V_{g_{TOC}}}\right)\frac{d^2_{CLB}}{h_{TOC}}(\epsilon_{D_{CLB}} - \epsilon_{D_{FMS}})\overline{\left(\frac{C_D}{C_L}\right)}_{CLB} + \quad [9]$$

$$\frac{\left[\frac{\partial FF}{\partial T}\frac{D}{V_G}\right]_{TOC} + \left[\frac{\partial FF}{\partial T}\frac{D}{V_G}\right]_{TOD}}{2}(\epsilon_{D_{CRZ}} - \epsilon_{D_{FMS}})(d_{TOD} - d_{TOC}) +$$

$$\left(\frac{FF_{CRZ} - FF_{DES}}{V_{g_{TOD}}}\right)\frac{d^2_{DES}}{h_{TOD}}(\epsilon_{D_{DES}} - \epsilon_{D_{FMS}})\overline{\left(\frac{C_D}{C_L}\right)}_{DES} = 0$$

The resulting synthetic drag factor is given by:

$$\epsilon_{D_{FMS}} = \frac{numerator}{denominator}$$

$$numerator = \left(\frac{FF_{CLB} - FF_{CRZ}}{V_{g_{TOC}}}\right)\frac{d^2_{CLB}}{h_{TOC}}\epsilon_{D_{CLB}}\overline{\left(\frac{C_D}{C_L}\right)}_{CLB} +$$

$$\frac{\left[\frac{\partial FF}{\partial T}\frac{D}{V_G}\right]_{TOC} + \left[\frac{\partial FF}{\partial T}\frac{D}{V_G}\right]_{TOD}}{2}\epsilon_{D_{CRZ}}(d_{TOD} - d_{TOC}) +$$

$$\left(\frac{FF_{CRZ} - FF_{DES}}{V_{g_{TOD}}}\right)\frac{d^2_{DES}}{h_{TOD}}\epsilon_{D_{DES}}\overline{\left(\frac{C_D}{C_L}\right)}_{DES}$$

$$denominator = \left(\frac{FF_{CLB} - FF_{CRZ}}{V_{g_{TOC}}}\right)\frac{d^2_{CLB}}{h_{TOC}}\overline{\left(\frac{C_D}{C_L}\right)}_{CLB} +$$

$$\frac{\left[\frac{\partial FF}{\partial T}\frac{D}{V_G}\right]_{TOC} + \left[\frac{\partial FF}{\partial T}\frac{D}{V_G}\right]_{TOD}}{2}(d_{TOD} - d_{TOC}) +$$

$$\left(\frac{FF_{CRZ} - FF_{DES}}{V_{g_{TOD}}}\right)\frac{d^2_{DES}}{h_{TOD}}\overline{\left(\frac{C_D}{C_L}\right)}_{DES}$$

Note that the synthetic drag factor ($\epsilon_{D_{FMS}}$) will be very close to the cruise drag factor ($\epsilon_{D_{CRZ}}$) if the cruise segment of the flight, $d_{TOD} - d_{TOC}$, is much larger than the climb and descent phases of the flight e.g. for long-haul flights. However, for flights with short cruise segments, the climb and descent segments have significant influence on the synthetic drag factor in equation [9].

In other words, for short flights the drag characteristics during climb ($\epsilon_{D_{CLB}}$) and descent ($\epsilon_{D_{DES}}$) are significant to take into account in the synthetic drag factor ($\epsilon_{D_{FMS}}$) used by the FMS when performing the trip fuel estimation. In other words, for a short flight if the drag factor only derived from cruise data of previous flights is used by the FMS as the drag factor, significant errors in predicted fuel consumption in climb and descent are induced. The synthetic drag factor, together with the fuel factor, solves this problem.

Figure 5:
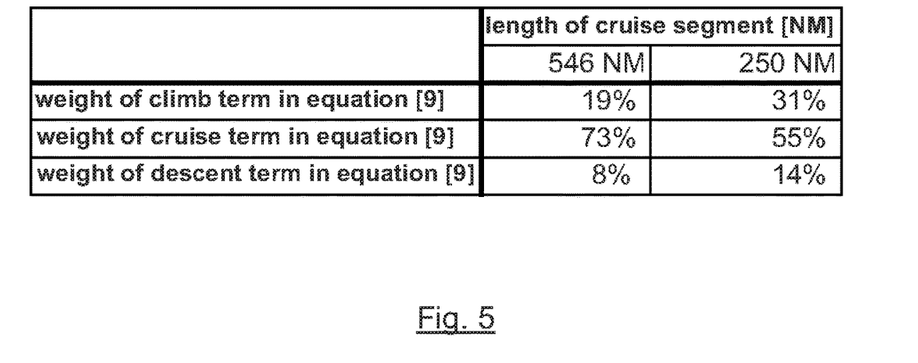
FIG. 5 depicts a table with the relative weights of climb, cruise and descent phases when computing the synthetic drag factor.

FIG. 5 shows the relative weights of the terms in equation [9] per flight phase using recorded flight data for two different flight distances, 250 NM and 546 NM, with a cruise altitude of 36,000 ft, a distance traveled during climb of 111.7 NM and 96.0 NM during descent. The numbers of this example confirm that for a flight with a short cruise segment the climb and descent drag factors have a larger weight on the synthetic drag factor.

Back to FIG. 2, in step 206 an update of fuel factors per flight phase is carried out. Once the synthetic drag factor 204 is calculated 202 for the upcoming flight, the fuel factors of each flight phase are updated (e.g. with the APM tool that airlines use to calculate the performance of a particular aircraft tail and engines). The resulting fuel factors are denoted by $\hat{\epsilon}_{FF_{CLB}}$, $\hat{\epsilon}_{FF_{CRZ}}$ and $\hat{\epsilon}_{FF_{DES}}$.

The aircraft performance monitoring tool takes flight data from recent flights. Then, the APM tool computes:

a) Drag deviations which can be inferred from the difference between the thrust required for a given flight condition and thrust derived from the engine conditions. The drag factor is computed by filtering many drag deviations collected from past flights.

b) Fuel flow deviations, which is the difference between the expected fuel flow for a given flight condition versus the actual measured fuel flow. The fuel flow factor is computed by filtering many fuel flow deviations collected from past flights.

If the synthetic drag factor is given, as it has been calculated in step 202, the APM tool can go directly to b) and use the synthetic drag factor to derive thrust levels from each flight condition; from each of these thrust levels, an expected fuel flow can be calculated. These expected fuel flows will then be used to calculate the fuel flow deviations and the fuel factor.

Finally, in step 210 a single synthetic fuel factor 212 ($\epsilon_{FF_{FMS}}$) is obtained 210. The synthetic fuel factor will be used by the FMS to make the trip fuel estimate equal to that calculated by the flight planning tool. The formula to calculate this synthetic fuel factor is:

$$\epsilon_{FF_{FMS}} = \frac{\hat{\epsilon}_{FF_{CLB}} W_{F_{CLB}} + \hat{\epsilon}_{FF_{CRZ}} W_{F_{CRZ}} + \hat{\epsilon}_{FF_{DES}} W_{F_{DES}}}{W_{F_{CLB}} + W_{F_{CRZ}} + W_{F_{DES}}} \quad [10]$$

where $W_{F_{CLB}}$, $W_{F_{CRZ}}$ and $W_{F_{DES}}$ are the estimated fuel consumption in pounds during the flight phases climb, cruise and descent, respectively. These parameters ($W_{F_{CLB}}$, $W_{F_{CRZ}}$, $W_{F_{DES}}$) are estimated by the flight planning tool using the updated fuel factors ($\hat{\epsilon}_{FF_{CLB}}$, $\hat{\epsilon}_{FF_{CRZ}}$ and $\hat{\epsilon}_{DES}$). The synthetic drag and fuel factors 118 ($\epsilon_{D_{FMS}}$, $\epsilon_{FF_{FMS}}$) are then used by the FMS to compute the estimated total fuel required 122 for the given flight plan 108, and an amount of fuel is loaded onto the aircraft such that the total fuel load is substantially equal to the estimated total fuel required 122 for the given flight plan 108.

The present method provides several advantages:

Firstly, the trip fuel estimated by the FMS is equal to the fuel computed by the flight planning tool. The discrepancy in trip fuel estimates is thus removed. Pilots prefer this kind of consistent data. When the flight plan is uploaded to the FMS, the FMS will now not notify the pilots that there will not be enough fuel to safely reach the destination, since with the present method the trip fuel estimates are the same. Therefore, pilots will not request more fuel to be loaded onboard than the flight plan indicated.

Figure 6:
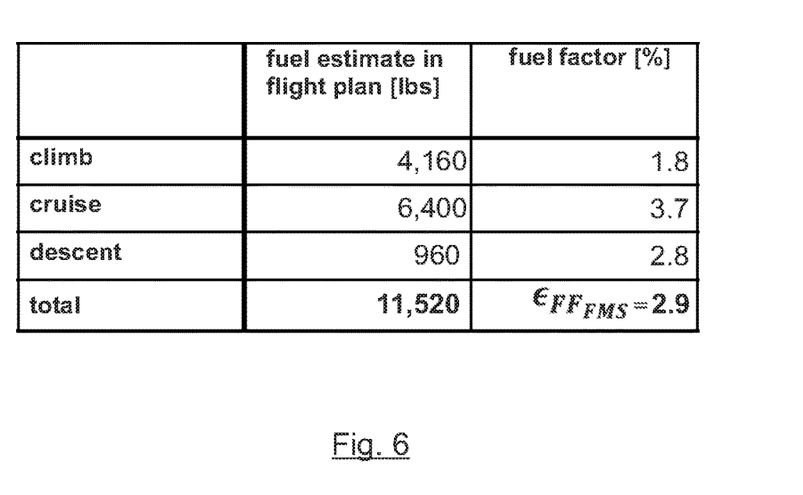
FIG. 6 depicts a table with fuel estimate and fuel factors for a given flight plan.

Secondly, cost savings. FIG. 6 shows the fuel estimates in the flight plan and fuel factors computed from recorded flight data. The FMS trip fuel estimate using the cruise fuel factor of 3.7% over all flight phases is 11,606 lbs. Using the synthetic fuel factor of 2.9%, obtained from equation [10], the FMS trip fuel estimate is 11,520 lbs, equal to the trip fuel estimate of the flight plan. Therefore, the pilots will load 86 lbs less fuel onboard.

Thirdly, the method can be integrated into CAS products for the airlines. Examples are the APM software and a product to update the FMS aircraft performance data more frequently.

Figure 7:
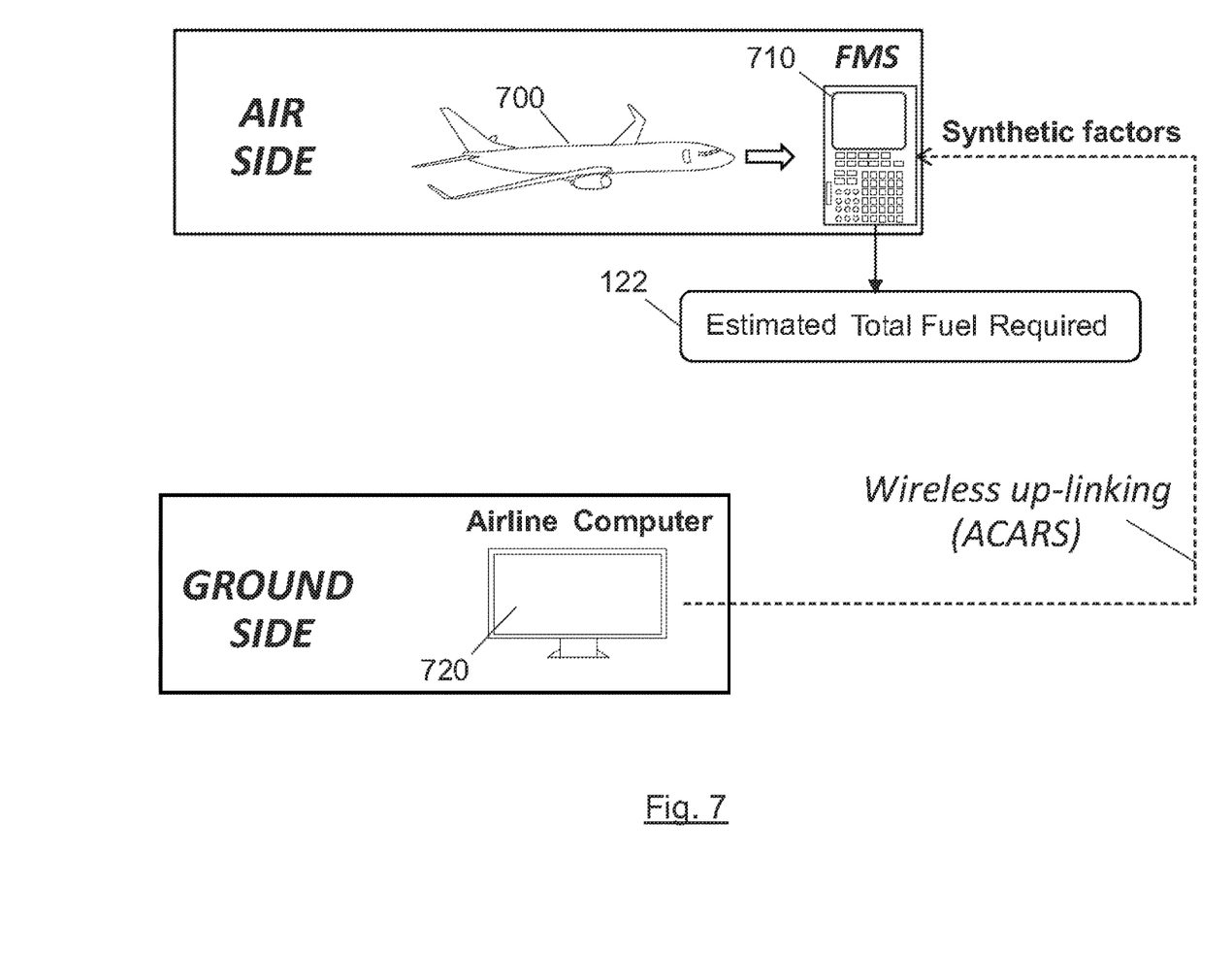
FIGS. 7 and 8 depict two embodiments of an electronic device used for providing an optimal quantity of aircraft fuel.
Figure 8:
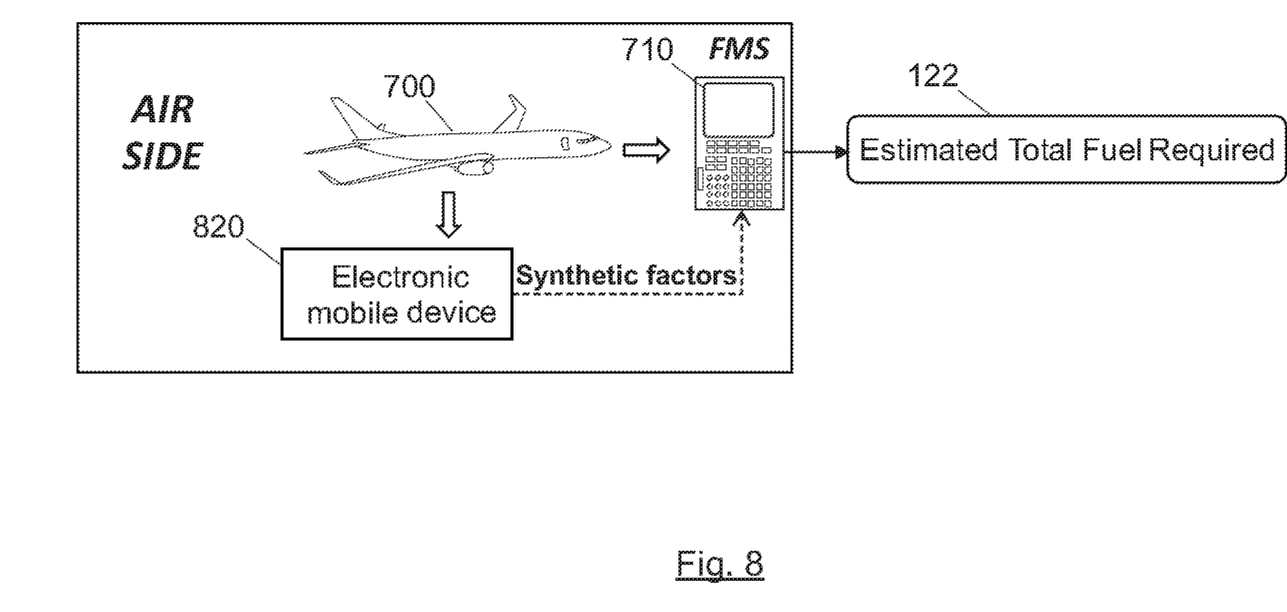

FIGS. 7 and 8 depict basic diagrams of an electronic device for providing an optimal quantity of aircraft fuel, according to two different embodiments. The electronic device 720 of FIG. 7 comprises a processor or processing unit configured for determining the drag and fuel synthetic factors 118 according to the method previously described. The aircraft FMS 710 determines an estimated total fuel required 122 using the flight plan 108 and the synthetic factors 118.

In the embodiment of FIG. 7 the electronic device 720 is implemented as a ground station (e.g. an airline computer). In this embodiment, the electronic device 720 and the aircraft FMS 710 are linked using a wireless communication, such as ACARS (Aircraft Communications Addressing and Reporting System). Once the processing unit of the electronic device 720 computes the synthetic factors 118, they are passed to the FMS 710, which in turn computes and provides the estimated total fuel required 122. As represented in the example of FIG. 8, the computation of the synthetic factors 118 may be performed by an electronic device 820 onboard, such as an electronic mobile device (e.g. a tablet, an electronic flight bag) operated in the flight deck. The electronic mobile device 820 communicates the synthetic factors to the FMS, preferably by establishing a secure wireless connection (although a wired connection may also be used) using a wireless communication module, such as WiFi or Bluetooth.

Figure 9:
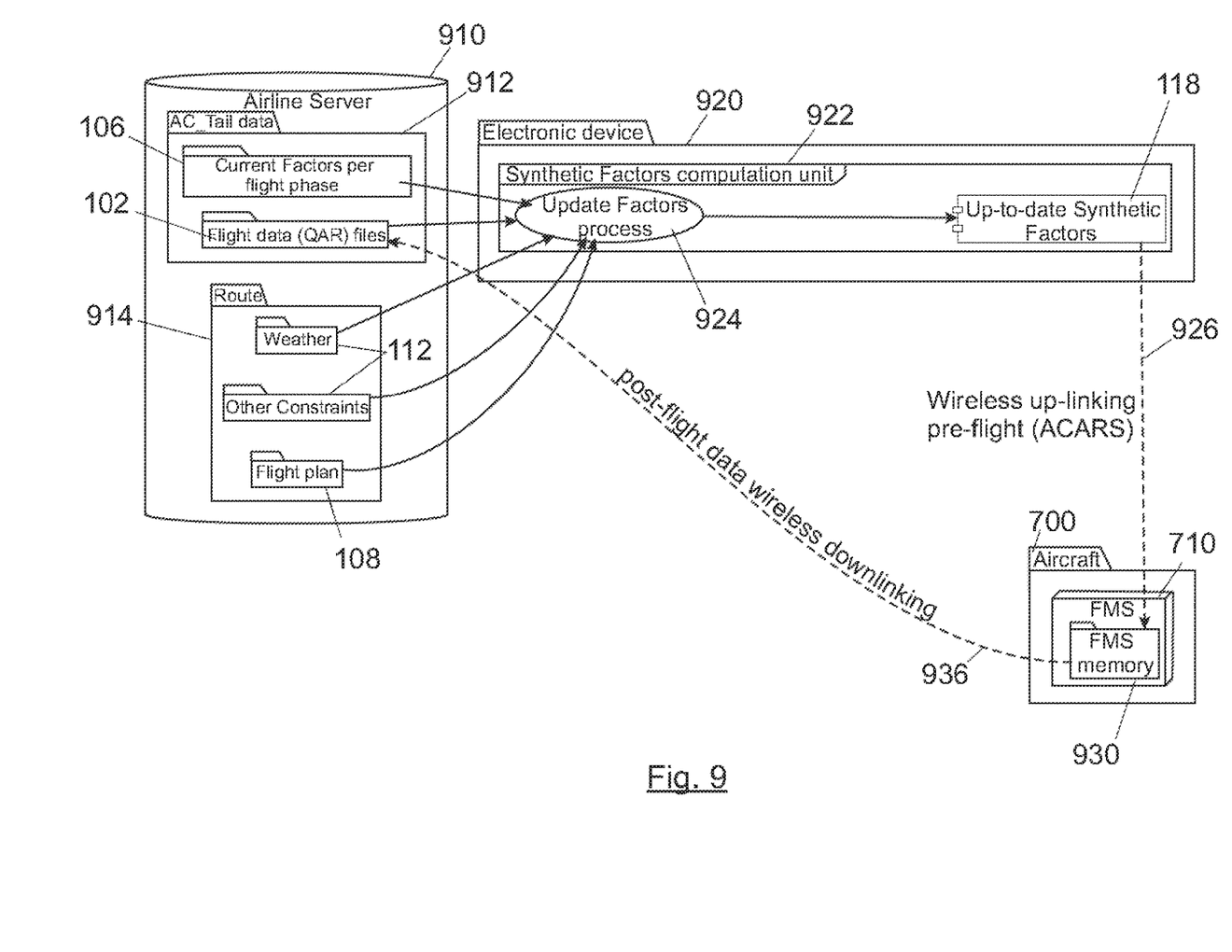
FIG. 9 shows the updating of drag and fuel synthetic factors in an electronic device.

The diagram depicted in FIG. 9 shows the process of updating synthetic factors 118 in an electronic device 920 (in the example of FIG. 9, a ground-based electronic device) using data from an airline server 910. The electronic device 920 retrieves data stored in the airline server 910. In particular, aircraft tail data 912 and route data 914 are recovered and updated 924 by a processing unit 922 or synthetic factors computation unit (for instance, a processor) of the electronic device 920.

Aircraft tail data 912 includes current aircraft specific performance correction parameters 106 (drag and fuel factors per flight phase) and recorded flight data 102 from previous flights. Route data 914 comprises information relating to the next flight plan 108 and additional data 112 relating to factors (e.g. weather and other constraints such as air space delays) that affect the total fuel required for the given flight plan 108. Once the synthetic factors 118 are computed and updated, they are wirelessly uploaded 926 to the aircraft FMS 710 and stored on a FMS memory 930. After executing the flight plan, the post-flight data can be wirelessly downloaded 936 to the airline server 910, so that current aircraft specific performance correction parameters 106 are updated.

The invention claimed is:

1. A method for providing an optimal quantity of aircraft fuel, comprising:
   collecting recorded flight data from past flights of an aircraft;
   determining, using an Aircraft Performance Monitoring tool, aircraft specific performance correction parameters comprising drag and fuel factors ($\epsilon_{D_{CLB}}$, $\epsilon_{D_{CRZ}}$, $\epsilon_{D_{DES}}$, $\epsilon_{FF_{CLB}}$, $\epsilon_{FF_{CRZ}}$, $\epsilon_{FF_{DES}}$) for each of the climb, cruise, and descent flight phases, using the recorded flight data;
   collecting a flight plan of the aircraft;
   determining, using a flight planning tool, the total fuel required for the given flight plan, using the aircraft specific performance correction parameters;
   determining a single synthetic drag factor ($\epsilon_{D_{FMS}}$) and a single synthetic fuel factor ($\epsilon_{FF_{FMS}}$) that, when used by an onboard aircraft Flight Management System (FMS), yield the said total fuel required for the given flight plan;
   communicating from a ground side device the given flight plan, the single synthetic drag factor ($\epsilon_{D_{FMS}}$) and the single synthetic fuel factor ($\epsilon_{FF_{FMS}}$) to the onboard aircraft FMS;
   receiving an estimated total fuel required determined by the onboard aircraft FMS based on the flight plan, the single synthetic drag factor ($\epsilon_{D_{FMS}}$) and the single synthetic fuel factor ($\epsilon_{FF_{FMS}}$);
   requesting loading of an amount of fuel onto the aircraft based on the estimated total fuel required for the given flight plan;
   wherein the step of determining the single synthetic drag factor ($\epsilon_{D_{FMS}}$) and the single synthetic fuel factor ($\epsilon_{FF_{FMS}}$) comprises:
   determining the single synthetic drag factor ($\epsilon_{D_{FMS}}$) using the flight plan and the aircraft specific drag factors ($\epsilon_{D_{CLB}}$, $\epsilon_{D_{CRZ}}$, $\epsilon_{D_{DES}}$) per flight phase;
   calculating updated fuel factors for climb, cruise, and descent flight phases using the calculated single synthetic drag factor ($\epsilon_{D_{FMS}}$);
   determining the single synthetic fuel factor ($\epsilon_{FF_{FMS}}$) using the updated fuel factors.

2. The method of claim 1, wherein the single synthetic drag factor is determined taking the condition that the estimated total fuel required for the given flight plan using the single synthetic drag factor is substantially the same as the total fuel required when using the aircraft specific drag factors ($\epsilon_{D_{CLB}}$, $\epsilon_{D_{CRZ}}$, $\epsilon_{D_{DES}}$) per flight phase.

3. The method of claim 1, wherein the updated fuel factors are calculating by:
   deriving thrust levels from each flight condition using the synthetic drag factor from each of the derived thrust levels, calculating an expected fuel flow;
   calculating the fuel flow deviations using the expected fuel flows;
   calculating the updated fuel factors using the fuel flow deviations.

4. The method of claim 1, wherein the single synthetic fuel factor is determined taking the condition that the estimated total fuel required for the given flight plan using the single synthetic fuel factor is substantially the same as the total fuel required when using updated fuel factors per flight phase.

5. The method of claim 1, further comprising collecting additional data including factors that affect the total fuel required, wherein said additional data is used to determine the total fuel required and comprises at least one of weather conditions and air space delays for the given flight plan.

6. The method of claim 1, wherein the estimated total fuel required determined by the onboard aircraft FMS based on the flight plan, the single synthetic drag factor ($\epsilon_{D_{FMS}}$) and the single synthetic fuel factor ($\epsilon_{FF_{FMS}}$) is less than a total required fuel as determined by the FMS based on a drag factor and fuel factor calculated only in relation to a cruise flight phase.

7. An electronic device for providing an optimal quantity of aircraft fuel, comprising a processing unit configured to:
   collect recorded flight data from past flights of an aircraft;
   determine, using an Aircraft Performance Monitoring tool, aircraft specific performance correction parameters comprising drag and fuel factors ($\epsilon_{D_{CLB}}$, $\epsilon_{D_{CRZ}}$, $\epsilon_{D_{DES}}$, $\epsilon_{FF_{CLB}}$, $\epsilon_{FF_{CRZ}}$, $\epsilon_{FF_{DES}}$) for each of the climb, cruise, and descent flight phases, using the recorded flight data;
   collect a flight plan of the aircraft;
   determine, using a flight planning tool, the total fuel required for the given flight plan using the aircraft specific performance correction parameters;
   determine a single synthetic drag factor ($\epsilon_{D_{FMS}}$) using the flight plan and the aircraft specific drag factors ($\epsilon_{D_{CLB}}$, $\epsilon_{D_{CRZ}}$, $\epsilon_{D_{DES}}$) per flight phase;
   calculate updated fuel factors for climb, cruise, and descent flight phases using the calculated single synthetic drag factor ($\epsilon_{D_{FMS}}$);
   determine a single synthetic fuel factor ($\epsilon_{FF_{FMS}}$) using the updated fuel factors;
   send the single synthetic drag factor ($\epsilon_{D_{FMS}}$) and the single synthetic fuel factor ($\epsilon_{FF_{FMS}}$) from a ground side device to an onboard aircraft Flight Management System (FMS) that uses the single synthetic drag factor ($\epsilon_{D_{FMS}}$) and the single synthetic fuel factor ($\epsilon_{FF_{FMS}}$) to yield the total fuel required for the given flight plan.

8. The electronic device of claim 7, further comprising a wireless communication module configured to wirelessly communicate the single synthetic drag factor ($\epsilon_{D_{FMS}}$) and the single synthetic fuel factor ($\epsilon_{FF_{FMS}}$) to the onboard aircraft FMS.

9. The electronic device of claim 8, further configured to receive an estimated total fuel required determined by the onboard aircraft FMS.

10. The electronic device of claim 9, wherein the estimated total fuel required is determined by the onboard aircraft FMS based on the flight plan, the single synthetic drag factor ($\epsilon_{D_{FMS}}$) and the single synthetic fuel factor ($\epsilon_{FF_{FMS}}$).

11. The electronic device of claim 10 wherein the estimated total fuel required as determined by the onboard aircraft FMS based on the flight plan, the single synthetic drag factor ($\epsilon_{D_{FMS}}$) and the single synthetic fuel factor ($\epsilon_{FF_{FMS}}$) is less than a total required fuel as determined by the onboard aircraft FMS based on a drag factor and fuel factor calculated only in relation to a cruise flight phase.

12. A computer program product for providing an optimal quantity of aircraft fuel, comprising a non-transitory computer readable medium having computer code instructions stored thereon that, when executed by a processor, causes the processor to:
   collect recorded flight data from past flights of an aircraft;
   determine, using an Aircraft Performance Monitoring tool, aircraft specific performance correction parameters comprising drag and fuel factors ($\epsilon_{D_{CLB}}$, $\epsilon_{D_{CRZ}}$, $\epsilon_{D_{DES}}$, $\epsilon_{FF_{CLB}}$, $\epsilon_{FF_{CRZ}}$, $\epsilon_{FF_{DES}}$) for each of the climb, cruise, and descent flight phases, using the recorded flight data;
   collect a flight plan of the aircraft;
   determine, using a flight planning tool, the total fuel required for the given flight plan using the aircraft specific performance correction parameters;
   determine a single synthetic drag factor ($\epsilon_{D_{FMS}}$) using the flight plan and the aircraft specific drag factors ($\epsilon_{D_{CLB}}$, $\epsilon_{D_{CRZ}}$, $\epsilon_{D_{DES}}$) per flight phase;
   calculate updated fuel factors for climb, cruise, and descent flight phases using the calculated single synthetic drag factor ($\epsilon_{D_{FMS}}$);
   determine a single synthetic fuel factor ($\epsilon_{FF_{FMS}}$) using the updated fuel factors;
   send the single synthetic drag factor ($\epsilon_{D_{FMS}}$) and the single synthetic fuel factor ($\epsilon_{FF_{FMS}}$) from a ground side device to an onboard aircraft Flight Management System (FMS) that uses the single synthetic drag factor and the single synthetic fuel factor to yield the total fuel required for the given flight plan.

13. The computer program product of claim 12, wherein the processor is further configured to:
   communicate the given flight plan, the single synthetic drag factor ($\epsilon_{D_{FMS}}$) and the single synthetic fuel factor ($\epsilon_{FF_{FMS}}$) to the onboard aircraft FMS;
   receive an estimated total fuel required determined by the onboard aircraft FMS based on the flight plan, the single synthetic drag factor ($\epsilon_{D_{FMS}}$) and the single synthetic fuel factor ($\epsilon_{FF_{FMS}}$); and
   request loading of an amount of fuel onto the aircraft based on the estimated total fuel required for the given flight plan.

14. The computer program product of claim 12, wherein the single synthetic drag factor is determined taking the condition that the estimated total fuel required for the given flight plan using the single synthetic drag factor is substantially the same as the total fuel required when using the aircraft specific drag factors ($\epsilon_{D_{CLB}}$, $\epsilon_{D_{CRZ}}$, $\epsilon_{D_{DES}}$) per flight phase.

15. The computer program product of claim 12, wherein the updated fuel factors are calculated by:
   deriving thrust levels from each flight condition using the synthetic drag factor from each of the derived thrust levels, calculating an expected fuel flow;
   calculating the fuel flow deviations using the expected fuel flows;
   calculating the updated fuel factors using the fuel flow deviations.

16. The computer program product of claim 12, wherein the single synthetic fuel factor is determined taking the condition that the estimated total fuel required for the given flight plan using the single synthetic fuel factor is substantially the same as the total fuel required when using updated fuel factors per flight phase.

17. The computer program product of claim 12, wherein the processor is further configured to collect additional data including factors that affect the total fuel required, wherein said additional data is used to determine the total fuel required and comprises at least one of weather conditions and air space delays for the given flight plan.

18. The computer program product of claim 12, wherein the estimated total fuel required as determined by the onboard aircraft FMS based on the flight plan, the single synthetic drag factor ($\epsilon_{D_{FMS}}$) and the single synthetic fuel factor ($\epsilon_{FF_{FMS}}$) is less than a total required fuel as determined by the onboard aircraft FMS based on a drag factor and fuel factor calculated only in relation to a cruise flight phase.

* * * * *